United States Patent Office 3,519,018
Patented July 7, 1970

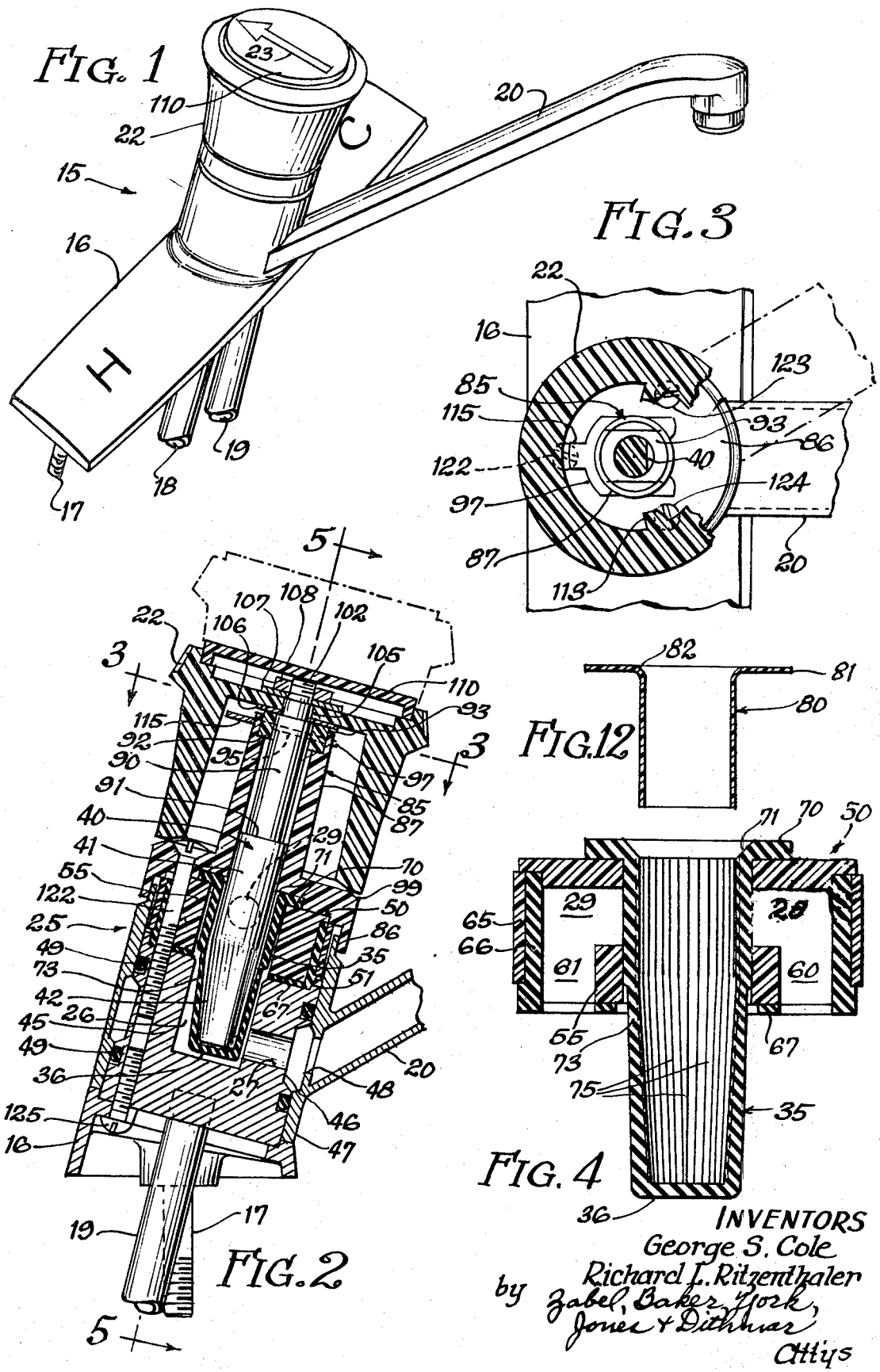

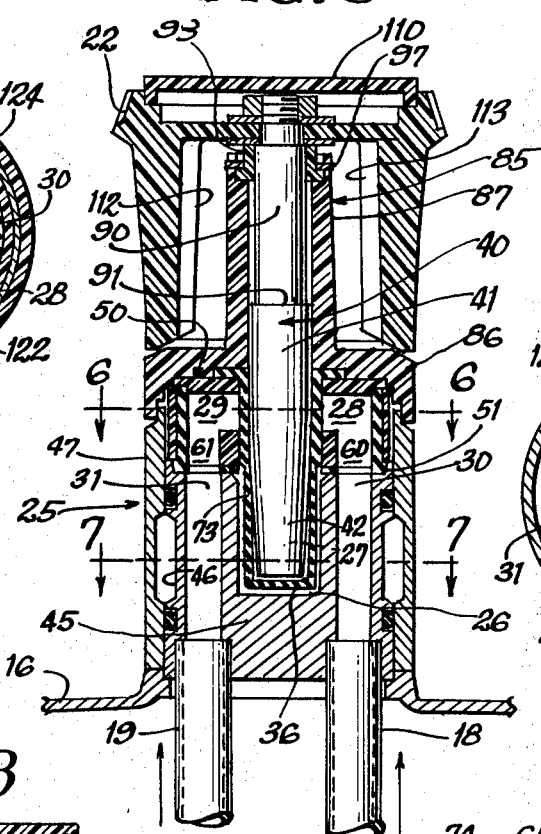

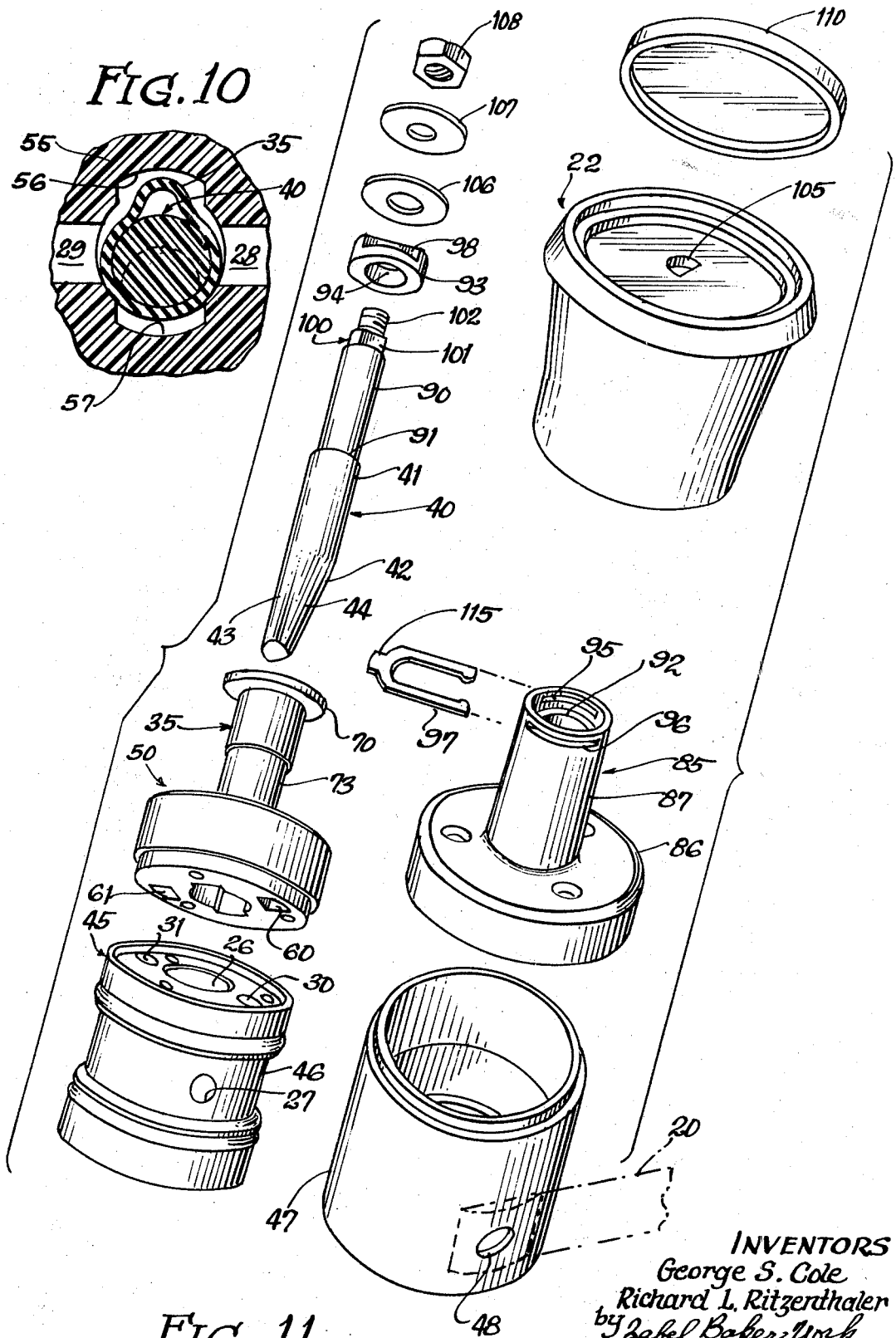

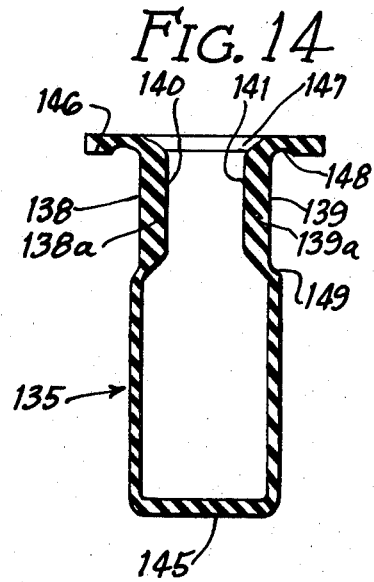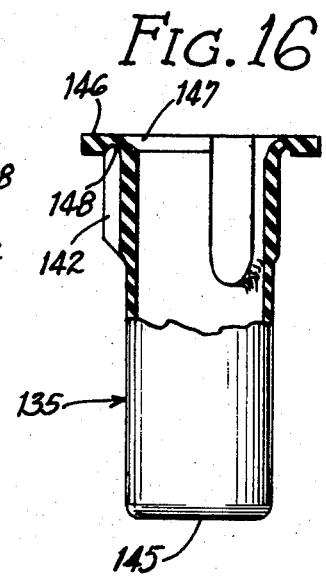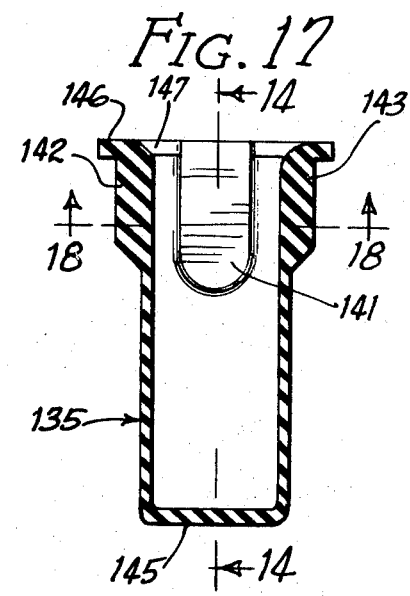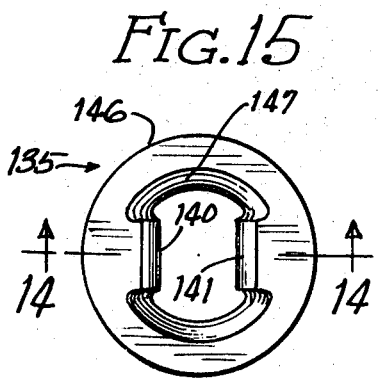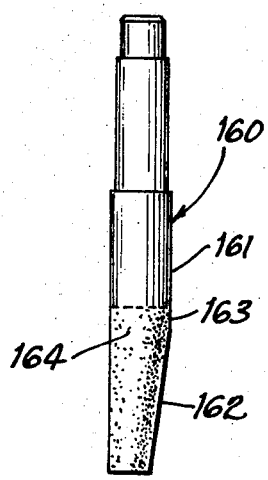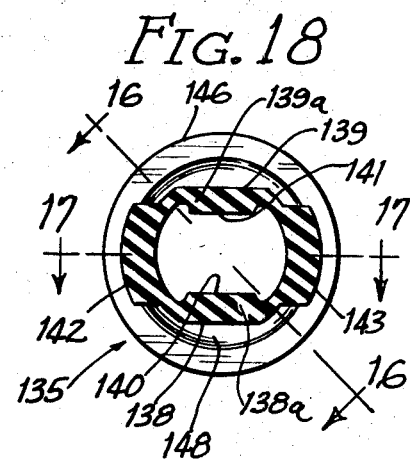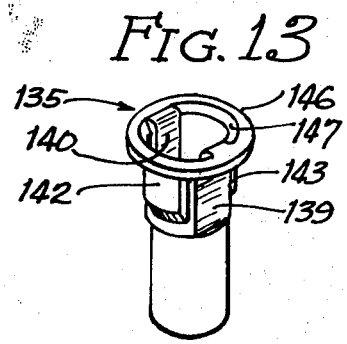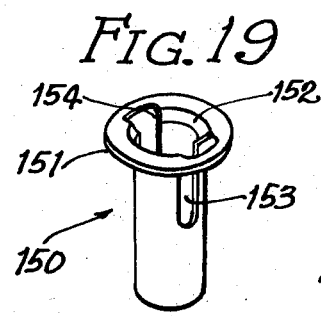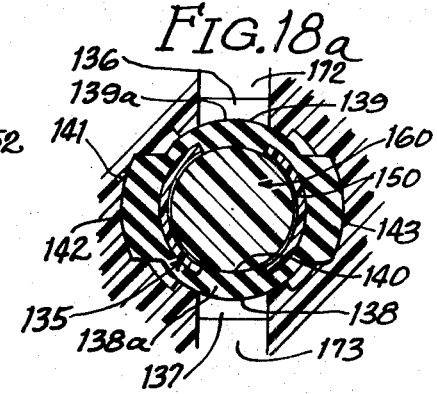

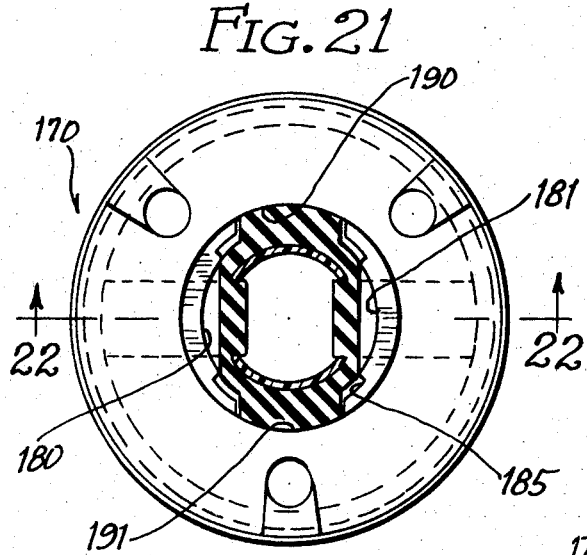
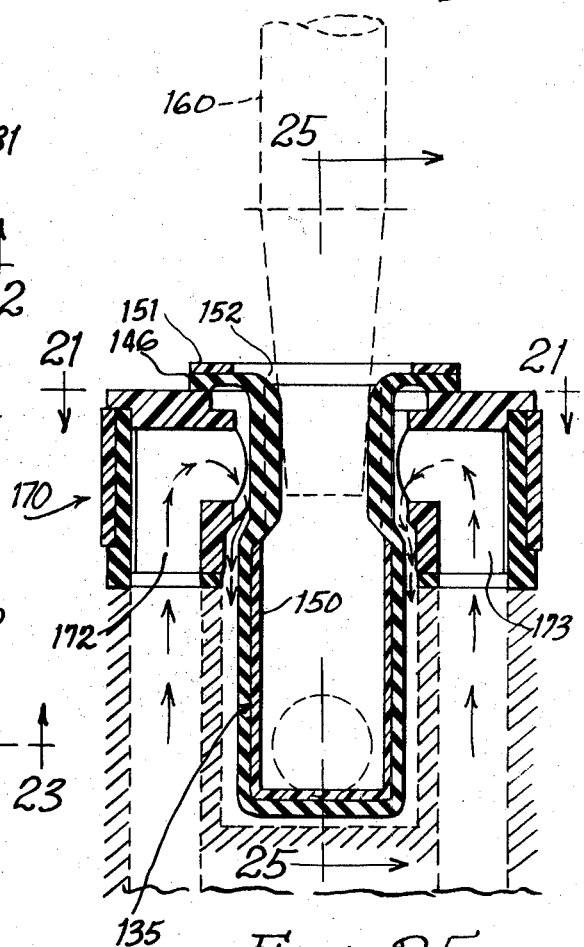
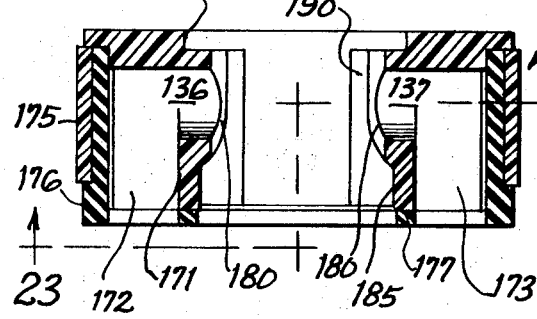
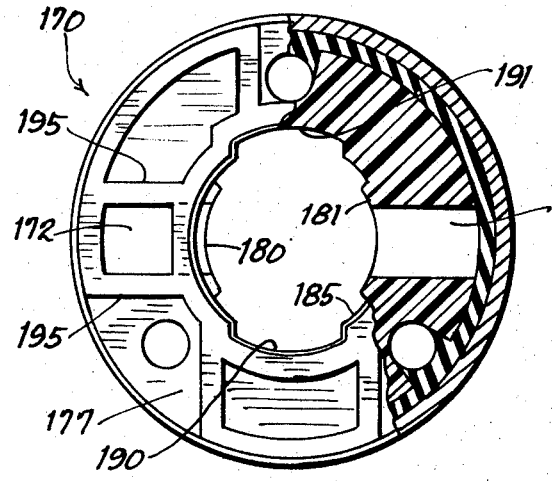
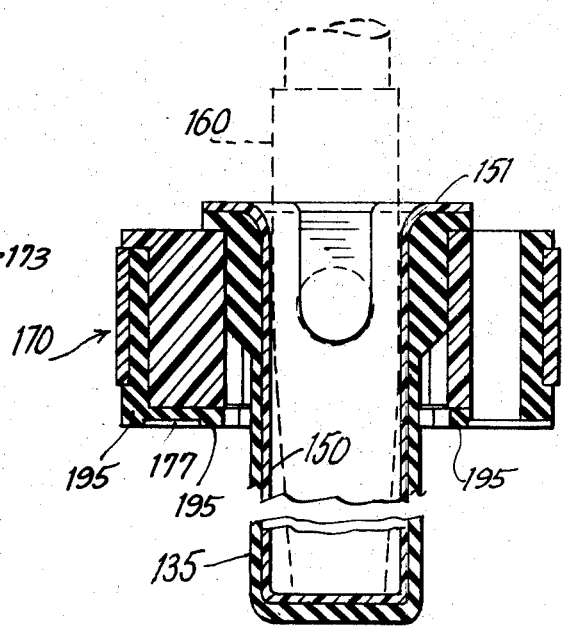

---

3,519,018
PROPORTIONING VALVE
George S. Cole and Richard L. Ritzenthaler, Oconomowoc, Wis., assignors to Cole Valve Corporation, Menomonee Falls, Wis., a corporation of Wisconsin
Continuation-in-part of application Ser. No. 477,384, Aug. 5, 1965. This application Aug. 16, 1968, Ser. No. 755,498
Int. Cl. F16k *11/02*
U.S. Cl. 137—625.4        39 Claims

ABSTRACT OF THE DISCLOSURE

A proportioning valve for two fluids wherein a single handle is employed to control both proportion and volume of flow, including shut off. A valve body has a longitudinal recess with an outlet port and a pair of spaced inlet ports in the wall of the recess. A sleeve of resilient material within the recess overlies the inlet ports. A control means, actuated by the aforesaid single handle, is located within the sleeve, and is axially movable and rotatable with respect to the sleeve to cooperate with the sleeve for respectively varying the quantity and proportion of fluid flow through the inlet ports and the valve itself. In one axial position the control means holds the sleeve against both inlet ports to close same, regardless of position in rotation, and when in other axial positions the control means allows the sleeve to become displaced to greater or lesser extent from one or both of the inlet ports, thereby varying the quantity and proportion of fluid flow through the inlet ports. In more detailed aspect, a cartridge is used to provide some of the ports and passageways, thereby facilitating fabrication, and means are provided to control friction between the sleeve and control member. Means also are provided to assure greater fluid flow at low pressure, and to prevent fluid at high pressure from displacing the control member axially.

CROSS-REFERENCE TO RELATED APPLICATION

This application is a continuation-in-part of prior copending application of the present applicants, Ser. No. 477,384, now abandoned, filed Aug. 5, 1965, for Proportioning Valve.

BACKGROUND OF THE INVENTION

This invention relates to a proportioning valve for two fluids of different characteristics, such as hot and cold water, and more particularly to a proportioning valve wherein a single handle is employed to control both proportion and volume of flow.

The above identified prior copending application has been examined in Group 362, and the references cited in the prosecution to date are classified for the most part in Class 137, Fluid Handling, Subclasses 625 and 675.

As far as is known to applicants, there is no practical or commercial prior art which approaches the present invention in structure and function. The prior art cited in the above entitled prior copending application is the closest art known to applicants and, as will be seen, this art fails to show or suggest the present development.

Most single handled proportioning valves in current use are complicated devices employing a comparatively large number of component parts, both metallic and non-metallic. Many of these parts necessarily are constructed with close tolerances, and are exceedingly difficult to assemble. Requisite lubrication always is a severe problem. Such valves are highly sensitive to wear and foreign matter, and thus require frequent repair or replacement. They also are expensive initially, and correspondingly expensive to maintain.

Single handled proportioning valves other than the present valve employ washers, gaskets, packings, springs, strainers, or O-rings, to name a few conventional parts commonly used. Further, such valves usually have metal-to-metal bearings or seals which are subject to wear and corrosion, and thus a source of trouble. The current valves require frequent maintenance or replacement.

Valves constructed in accordance with the invention, as will be seen, are simple, comparatively inexpensive to manufacture, and are highly effective in use; in short, they overcome the numerous shortcomings of prior single handled proportioning valves, and constitute significant improvement thereover.

SUMMARY AND OBJECTS OF THE INVENTION

One object of the invention is to provide a single handled proportioning valve of radically different construction and mode of operation, compared with single handled proportioning valves of the prior art. The valve of the invention, which employs only one moving part, aside from a flexing resilient member, is equally well usable in kitchen, lavatory, bath or shower, to name the more common locations.

Another object is to provide a single handled proportioning valve containing only three main operating parts, namely, a ported valve body, a sleeve or equivalent of resilient material, such as rubber, and a control means. The control means is movable axially to control volume and rotatable on its axis to control proportioning. The comparatively simple valve of the invention may be manufactured at extremely low cost, and, in operation, is not sensitive to wear or contamination by foreign matter.

Another object is to provide a single handled proportioning valve having highly effective and essentially permanent lubrication, thus overcoming one of the major shortcomings of prior single handled valves.

Still another object is to provide a single handled proportioning valve which is disassembled easily without special tools, and which may be serviced, if servicing is necessary, by an unskilled person. The valve may be taken apart completely and reassembled in two minutes with only a screw driver.

Another object is to provide a proportioning valve that is self-cleaning during use.

Still another object is to provide a proportioning valve that possesses an inherent anti-siphon characteristic and substantial freedom from water hammer.

Other and more detailed objects of the invention are to provide refinements in the aforesaid main operating parts of the valve. These refinements, such as anti-friction means, for example, cooperate, as will be seen, to enhance the operating and trouble-free qualities and characteristics of the valve.

Another object is to provide a proportioning valve which does not use washers, gaskets, packings, springs, strainers, or O-rings, to name a few conventional parts commonly used in proportioning valves of the single handle type. Further, the present valve does not require metal-to-metal bearings or seals, thereby eliminating metal wear and corrosion at critical points.

Other objects, features and advantages of the invention will be apparent as the description proceeds, reference being had to the accompanying drawings wherein various embodiments of the invention are shown. It is to be understood that the description and drawings are illustrative only, and that the scope of the invention is to be measured by the appended claims.

BRIEF DESCRIPTION OF THE DRAWING

FIG. 1 is a perspective view of a single handled proportioning valve embodying the invention, the valve designed for kitchen use and provided with a so-called swing spout.

FIG. 2 is an enlarged fragmentary longitudinal sectional view of the proportioning valve shown in FIG. 1, the section plane intersecting the valve axis and the center line of the spout when the latter is positioned centrally of its swing range.

FIG. 3 is a fragmentary sectional view, partly broken away, on line 3—3 of FIG. 2.

FIG. 4 is an enlarged sectional view on a portion of line 5—5 of FIG. 2 showing two of the three main operating parts of the valve, the third omitted for clarity.

FIG. 5 is a longitudinal sectional view on line 5—5 of FIG. 2, the valve shown in fully closed condition.

FIG. 6 is a sectional view on line 6—6 of FIG. 5.

FIG. 7 is a sectional view on line 7—7 of FIG. 5.

FIG. 8 is a sectional view generally similar to FIG. 5 except that the valve is shown in the condition where one inlet port is closed and the other inlet port is fully opened.

FIG. 9 is an enlarged sectional view on line 9—9 of FIG. 8.

FIG. 10 is a fragmentary sectional view similar to FIG. 9 showing a valve condition wherein both inlet ports are opened.

FIG. 11 is an exploded view showing in perspective the several parts of the illustrated valve.

FIG. 12 is a longitudinal sectional view of an antifriction part that optionally may be used in the valve.

FIG. 13 (lower left of Sheet 4) is a perspective view of a resilient sleeve used in a modified second embodiment of the invention.

FIG. 14 is a longitudinal sectional view of the sleeve shown in FIG. 13 taken on the lines 14—14 of FIGS. 15 and 17.

FIG. 15 is a top plan view of the sleeve shown in FIGS. 13 and 14.

FIG. 16 is an elevational view, partly in section, of the sleeve shown in FIG. 13, the sectional view taken on line 16—16 of FIG. 18.

FIG. 17 is a longitudinal sectional view of the sleeve taken on line 17—17 of FIG. 18.

FIG. 18 is a sectional view of the sleeve taken on line 18—18 of FIG. 17.

FIG. 18a is a fragmentary sectional view showing details of the modified second embodiment.

FIG. 19 is a perspective view of a secondary sleeve of thin, relatively rigid or stiff, low friction material for insertion in the sleeve of FIGS. 13–18.

FIG. 20 is an elevational view of the control means used in the modified second embodiment of the invention.

FIG. 21 is a top plan view of a cartridge used in the modified second embodiment of the invention, including a sectional view of associated components taken on line 21—21 of FIG. 24.

FIG. 22 is a longitudinal sectional view of the aforesaid cartridge taken on the line 22—22 of FIG. 21, the resilient sleeve and secondary sleeve shown in FIG. 21 omitted for clarity.

FIG. 23 is a bottom view, partly in section, of the cartridge shown in FIGS. 21 and 22 taken generally on the line 23—23 of FIG. 22.

FIG. 24 is a longitudinal sectional view taken on line 22—22 of FIG. 21, the control means shown in broken line in an open position for both inlet ports.

FIG. 25 is a longitudinal sectional view taken on line 25—25 of FIG. 24, the control means shown in broken line in closed position for both inlet ports, the non-cartridge part of the valve body omitted for clarity.

DESCRIPTION OF THE PREFERRED EMBODIMENTS

Referring first to FIG. 1 of the drawings, the exemplary single handled proportioning valve there shown is designated 15. The visible exterior components of valve 15, which, incidentally, are not part of the invention per se, include a mounting plate or base 16, threaded mounting studs 17, inlet pipes 18 and 19, outlet spout 20 and a handle 22.

Inlet pipes 18 and 19 are adapted to be connected to lines carrying fluids of different character, for example, hot and cold water. The purpose of a thusly connected valve 15, of course, is to proportion, as desired, the hot and cold water flowing through the valve, and to control the flow volume of the proportioned water. Handle 22 is rotated on its axis to control the proportioning, and moved back and forth axially to control volume. When handle 22 is moved downwardly to a limiting position, as shown in FIG. 1, the valve is fully closed. Upward movement of handle 22 opens the valve for a volume of flow depending on handle elevation.

An indicator such as arrow 23 may be applied to handle 22 to aid the user in proportioning the two fluids. Such an indicator may be referenced to H and C indices inscribed on base 16, as shown.

Referring to FIGS. 1–12 showing the first embodiment, the various features of the invention per se now will be described. As previously mentioned, the main structural and functional parts are three in number, namely a ported valve body, a sleeve or equivalent of resilient material and a control means. These parts will be described first in broad aspect, and thereafter in such detail as to set forth the aforesaid refinements.

Referring to FIG. 2, the valve body is generally designated 25. This part, in the refined form of the invention shown, is made up of several elements which later will be described individually. For the present it will be sufficient to state that valve body 25 has an internal recess 26, an outlet port 27 and a pair of spaced inlet ports 28 and 29, the latter being best shown in FIGS. 4, 5 and 8.

Inlet ports 28 and 29 are located in the walls of internal recess 26, and they are directed oppositely into the recess. As best shown in FIGS. 5, 6 and 9, a passageway 30 in valve body 25 connects port 28 with inlet pipe 18, while a passageway 31 connects inlet port 29 with pipe 19.

Outlet port 27 leads from internal recess 26 to the exterior of the valve body and into spout 20, as best shown in FIG. 2.

A sleeve 35 of resilient material such as rubber is located within internal recess 26 of valve body 25. As shown, sleeve 35 extends substantially the full length of the recess, and is closed at its lower end 36. The precise length of sleeve 35 and the closure feature are optional, as a shorter sleeve without an end closure functions satisfactorily. Alternatively, sleeve 35 could take the form of a ring member having a pair of downwardly extending opposing resilient portions, the latter overlying ports 28 and 29.

A cam-type control means 40, connected to handle 22, extends into sleeve 35. Control means 40, best shown in FIG. 11, has two main operating portions, namely, a cylindrical portion 41 and an adjacent portion 42 having the shape of a modified cone. For convenience, adjacent portion 42 sometimes will be referred to as conical portion 42, although it is understood that the portion is not truly conical.

Referring to FIG. 11, a surface part 43 of conical portion 42 having minor peripheral extent (substantially less than one-half) constitutes an extension of the aligned surface part of cylindrical portion 41. The chord subtending cylindrical surface part 43 of conical portion 42 has a length approximately the same as, or slightly more than, the diameter of inlet ports 28 and 29. As will be seen, this cylindrical surface part 43 of conical portion 42 is adapted to seal sleeve 35 over inlet port 28 or 29, depending on the angular orientation of control means 40.

Other surface parts 44 of conical portion 42 merge smoothly into cylindrical part 43. As will be understood, conical portion 42 has an axis of sorts, and this axis intersects the axis of cylindrical portion 41 at an angle. Further, the transition between cylindrical portion 41 and the other surface parts 44 of conical portion 42 is a surface that curves longitudinally as well as peripherally. The longitudinal curvature, as will be seen, cooperates to provide smooth axial movement of the control means 40 with respect to sleeve 35.

Referring to FIGS. 5 and 6, control means 40 is shown in extreme inward position. In this position, cylindrical portion 41 faces inlet ports 28 and 29. The diameters of valve body recess 26, sleeve 35 and cylindrical portion 41 are such that the latter seals the sleeve tightly over both ports 28 and 29 and prevents the inflow of fluid through the ports, even under fluid pressure of high value. The valve is fully closed when control means 40 is in the position shown.

When control means 40 is partially or fully withdrawn, as indicated in FIGS. 8, 9 and 10, conical portion 42 faces the inlet ports 28 and 29. In this circumstance one or both of the inlet ports will be partly or fully opened.

It is appropriate to state here that sleeve 35 initially has a tubular shape, and, unless deformed, would cover the inlet ports 28 and 29 regardless of the position of control means 40. However, the fluid at the inlet ports is under pressure, and this pressure is effective to deform sleeve 35 at those times when the sleeve is not backed up or reinforced in sealing manner by control means 40.

The position of control means 40 in FIGS. 8 and 9 is such that cylindrical part 43 of conical portion 42 faces inlet port 29, and therefore backs up in sealing manner the part of sleeve 35 covering port 29. At this time surface part 44 of conical portion 42 faces inlet port 28, and, due to its modified conical contour, part 44 does not seal sleeve 35 over port 28. Accordingly, the pressure of the fluid at port 28 deforms sleeve 35, as shown, and permits the fluid to enter internal recess 26 of valve body 25 in an amount depending on the axial position of control means 40. The position of control means 40 in FIGS. 8 and 9, incidentally, is such that port 28 is fully opened.

The fluid entering recess 26 through port 28 exits through outlet port 27 and is directed to spout 20, as will be understood.

Intermediate angular settings of control member 40 provide proportioning control. Thus, if control member 40 were rotated 90° in either direction from the position shown in FIGS. 8 and 9, for example to the position shown in FIG. 10, surface parts 44 of conical portion 42 would face both inlet ports 28 and 29, thereby permitting more or less equal flow through the ports. With hot and cold water at the ports, the resultant mixture flowing through spout 20 would have intermediate temperature and maximum volume. If control means 40 were moved inwardly to an intermediate position, the flow volume would be reduced with the temperature remaining the same.

The valve of the invention is designed so that the total flow through the valve when both inlet ports are opened to maximum extent simultaneously does not exceed the flow through the valve when one of the inlet ports is closed and the other is opened to maximum extent. This desirable characteristic is achieved by properly relating the size and shape of conical portion 42 with the diameter of the inlet ports. If the flow characteristic were otherwise, there possibly would be turbulence and unwanted back pressure during some conditions of valve operation.

From the foregoing, it is believed that the general construction and operation of the present valve are readily apparent. In the paragraphs following, various refinements in the main parts of the valve will be described in detail.

Valve body 25, in the form of the invention illustrated in FIGS. 1–12, includes a lower body part 45 and an upper body part hereinafter called valve cartridge 50. Lower part 45 contains the lower end of internal recess 26 and outlet port 27 leading therefrom. It also contains the lower ends of inlet passageways 30 and 31, as best shown in FIGS. 5 and 8.

In order to accommodate the illustrated swing spout 20, lower body part 45, which as shown is circular in cross section, has a peripheral recess 46 intermediate its ends. Outlet port 27 leads into the wall of this recess, as best shown in FIGS. 2 and 11.

A sleeve 47 to which spout 20 is attached surrounds lower body part 45, and is rotatable thereon. An opening 48 in sleeve 47 directs fluid to spout 20. Suitable sealing means such as O-rings 49 and 49 prevent leakage from recess 46, and yet permit the swinging action. It will be understood that these O-rings are incident to the optional swing spout, and are not requisite to the valve itself.

Previously mentioned valve cartridge 50, which forms the upper part of valve body 25, is received on the upper surface of lower body part 45. This upper surface is centrally recessed to form a seat for cartridge 50, and the peripheral walls defining this recess or seat are interiorly tapered as shown at 51. The tapered walls snugly receive the lower end of cartridge 50 and establish a peripheral seal having pressure and compression characteristics.

Cartridge 50, best shown in FIGS. 4 and 9, includes a central core 55, preferably made of plastic material, which contains the upper part of internal recess 26.

Referring to FIG. 9, an important feature of the FIG. 1–12 form of the invention involves the non-circular or irregular shape possessed by internal recess 26 in core 55. The portions of recess 26 intersected by inlet ports 28 and 29 have cylindrical walls of diameter slightly greater than the diameter of cylindrical portion 41 of control means 40. The size and shape relationships between the control means and these recess walls at the ports cooperate, of course, with resilient sleeve 35 to close the ports in sealing manner.

When control means 40 presses the material of resilient sleeve 35 in sealing manner over an inlet port, as shown in FIGS. 6 and 9, a certain amount of the material is displaced. The displaced material necessarily requires a space to occupy. Such space is provided by relieving the walls of recess 26 intermediate the wall portions containing ports 28 and 29. These relieved intermediate walls, designated 56 and 57 in FIGS. 9 and 10, also provide space for the reception of the portions of sleeve 35 that are displaced in response to the pressure of the fluid entering one or both of the inlet ports, again as shown in FIGS. 9 and 10.

Generally speaking, the relieved intermediate walls 56 and 57 of internal recess 26 in core 55 allow the normally tubular resilient sleeve 35 to assume a somewhat elliptical shape when the sleeve is functioning both to close and open one or both of the inlet ports. This elliptical shape minimizes the area of contact between sleeve 35 and control means 40, thereby greatly reducing friction and contributing to the smooth and reliable operation of the valve.

Continuing the description of core 55, inlet ports 28 and 29 extend from internal recess 26 to the exterior of the core, as shown in FIGS. 4 and 9. Also, the upper ends of passageways 30 and 31 constitute longitudinally extending recesses 60 and 61 (FIGS. 4, 5, 8 and 9) in the periphery of core 55, these recesses intersecting the ports 28 and 29.

Cartridge 50 also includes a so-called reinforcing ring 65, best shown in FIGS. 4 and 9, which, like core 55, may be formed of plastic material. Ring 65 is slightly shorter in axial length than core 55 (FIG. 4), and its inner diameter slightly exceeds the outer diameter of the main part of core 55. Reinforcing ring 65 is assembled, as will be seen, in concentric relation with core 55, the upper and lower ends of the ring terminating short of the upper and lower ends of the core.

The thusly assembled core 55 and ring 65 are positioned in a mold, and molding material such as rubber is directed into the annular space between core and ring. At this time the longitudinal recesses 60 and 61 on the exterior of core 55 are plugged so that the molding material does not fill the recesses. The same is true of internal recess 26. The lower face of core 55 is covered with a layer of the molding material so that the cartridge readily will establish a seal with lower part 45 of the valve body. The molding material in cartridge 50 is illustrated as rubber or rubber-like in the drawings and designated 66 in the annular space between core and ring and 67 on the lower face of core 55.

Resilient sleeve 35, in the refined form shown in the embodiment of FIGS. 1–12, is an elongated tubular member of circular cross section, closed at its lower end 36. The upper end of sleeve 35 has an outwardly extending sealing flange 70, best shown in FIGS. 4 and 11. When sleeve 35 is assembled in valve body 25, sealing flange 70 rests on the upper face of cartridge 50 and the tubular sleeve extends nearly the full length of internal recess 26.

An important feature of resilient sleeve 35 is the provision of a chamfered surface 71 joining the interior surface of the sleeve and the outer end face of sealing flange 70. The relief afforded by this chamfered surface cooperates to minimize friction between control means 40 and sleeve 35 at the flange end of the sleeve. As will be seen, flange 70 is subjected to clamping pressure, and the displaced material of the flange enters the relieved space rather than bearing against the control means.

Further describing the illustrated resilient sleeve 35 of the FIGS. 1–2 embodiment, the thickness of the flange and the wall thickness of that portion of the sleeve within cartridge 50 are about the same. The wall thickness of the sleeve immediately below the cartridge desirably is reduced as shown at 73, the wall thickness increasing as the lower closed end 36 is approached. The reason for reducing the wall thickness of the sleeve immediately below cartridge 50 is to provide greater flexibility in this region so the sleeve within the cartridge more easily may be distorted by the pressure of incoming fluid.

The increased thickness in the region approaching lower sleeve end 36 provides body to resist the line pressure of the fluid. With little or no distortion of sleeve 35 in this region, friction between the sleeve and control means 40 is minimized, and pressure from the fluid is not applied to the bottom of the control means. Thus, the fluid pressure is prevented from tending to move control means 40 in upwardly direction, avoiding unwanted change in a given flow rate setting.

As previously mentioned, a sleeve 35 without a closure at the lower end 36 functions satisfactorily in the valve of the invention. With an unclosed or open sleeve, fluid, of course, comes in contact with the interior of the sleeve and control means 40, thereby making it necessary to employ a seal for the shank of the control means.

Such a seal is avoided and other advantages provided by using a sleeve 35 with a closed lower end 36, as shown in the drawings. When a sleeve with a closed end is used, it is advantageous to provide venting between the sleeve interior and atmosphere, so there will be no pressure build-up in the sleeve to retard longitudinal movement of control means 40 into sleeve 35, or a vacuum condition within the sleeve tending to resist withdrawal of control means 40.

The illustrated valve of the FIGS. 1–12 embodiment has two features which, among other things, provide venting of the sleeve interior to atmosphere. One feature involves the aforesaid relief afforded by recessed walls 56 and 57 of central recess 26 within cartridge 50, as best shown in FIGS. 6, 9 and 10. As previously mentioned, this relief receives material of resilient sleeve 35 that is displaced both by the pressure applied by control means 40 in establishing a seal over inlet ports 28 and 29, as shown in FIGS. 6 and 9, and by the fluid pressure in opening the inlet ports, as shown in FIGS. 9 and 10. The presence of the enlarged spaces defined by walls 56 and 57 in cartridge 50 permits the initially circular sleeve 35 to assume at all times a generally oval shape in cross section. This oval shape of sleeve 35 in relation to the cylindrical or conical shape of control means 40 provides separation spaces 74 and 74 (FIG. 9) between sleeve and control means that constitute vents between the lower end of the sleeve and atmosphere.

The other venting feature mentioned above comprises longitudinally extending serrations 75 (FIG. 4) and intermediate recesses that optionally are provided on the interior surface of sleeve 35, the serrations extending downwardly beyond the length of sleeve 35 contained within cartridge 50. In view of the aforesaid spaces 74 and 74 between sleeve and control means, however, venting is a secondary or incidental function of the recesses between serrations 75.

The primary functions of serrations 75 are to hold a lubricant, such as silicone, in place more or less permanently, to reduce friction between control means and sleeve in view of lessened area of contact, and to prolong the effective life of the sleeve material. As to the latter, the serrations render the material of sleeve 35 more flexible and resistant to deterioration incident to the flexing. Extended tests with lubricated serrated sleeves indicate that the original lubrication is effective indefinitely and that such sleeves have greatly prolonged life.

As an alternative to serrations 75 and a permanent lubricant on the interior surface of sleeve 75, the invention contemplates the use of a thin, low friction sleeve 80 (FIG. 12) within main resilient sleeve 35. Sleeve 80, which may be formed of suitable plastic material, has an upper marginal flange 81 adapted to overlie flange 70 of sleeve 35. The region connecting anti-friction sleeve 80 and marginal flange 81 thereof tapers outwardly into flange 81 as shown at 82. This shape corresponds generally with the previously described chamfered surface 71 joining the interior of sleeve 35 and the outer end face of its sealing flange 70, and is provided for generally the same purpose.

The flexibility of anti-friction sleeve 80 is generally of the same order as that of sleeve 35 in the region of inlet ports 28 and 29, and therefore the influence of sleeve 80 has little or no effect on the valve function of opening and closing these ports. As mentioned, the use of sleeve 80 is optional, and a valve employing such a sleeve constitutes a modified form of the invention.

Another significant feature and advantage of a valve embodying the FIGS. 1–12 form of invention is the anti-siphon characteristic inherent in the design of the valve. As previously mentioned, the initial, normal shape and size of sleeve 35 is such that the sleeve covers and closes the inlet ports 28 and 29. When a cylindrical portion of control means 40 lies against the part of sleeve 35 covering one or both of the ports, as shown in FIG. 6, the port-covering part is so backed up that the line pressure of the inlet fluid is not effective to open the port or ports. However, when a conical surface part 44 of control means 40 opposes an inlet port (FIGS. 9 and 10), the back-up function is lacking and the pressure of the fluid is effective to displace the part of sleeve 35 covering the port, thereby opening the port for the forward flow of fluid through the valve.

When cylindrical portions of control means 40 oppose or face ports 28 and 29, these ports are positively sealed against the flow of fluid in reverse direction, thereby preventing a siphon condition in the event of a pressure reversal in a supply duct. Siphoning also is prevented even though a conical part 44 of control means 40 faces an inlet duct (opened valve condition), as will be understood when it is noted that sleeve 35 normally overlies the inlet ports in sealing manner. A pressure reversal merely tends to accentuate or enhance the seal, thereby preventing fluid from passing in reverse direction through the valve when control means 40 is set to permit forward flow.

Completing the description of the embodiment of FIGS. 1–12, a bearing member 85 (FIGS. 2, 3, 5, 8 and 11) is provided for control means 40. As shown, bearing member 85 includes a cap 86 that encloses the upper portion of cartridge 50 and telescopes spout sleeve 47. Bearing member 85 also includes a sleeve portion 87 that communicates with an aligned opening in the center of cap 86. The shank of control means 40 extends through sleeve portion 87 and the cap opening.

The interior surface of cap 86 surrounding the opening therein is recessed slightly to accommodate sealing flange 70 of sleeve 35, and the dimensions of the recess and flange are such that pressure is applied to flange 70 by bearing member 85 to establish a seal between flange 70, cartridge 50 and bearing member 85. As previously mentioned, the applied pressure displaces material of flange 70 into the space provided by chamfered surface 71 rather than against control means 40, thereby minimizing friction.

Suitable means are provided to limit axial movement of control means 40 in outwardly direction. In the form of the invention shown, control means 40 is reduced in diameter in its outer portion 90, thereby providing a shoulder 91 (FIGS. 2, 5, 8 and 11). The outer end of sleeve portion 87 of bearing member 85 is countersunk to provide a seat 92 for a bearing 93 having a central opening 94 of about the same diameter as outer portion 90 of control means 40. The countersunk outer end of sleeve portion 87 is provided with opposing slots 95 and 96, best shown in FIG. 11, which receive a bifurcated member 97. The legs of bifurcated member 97 enter slots 95 and 96, and embrace flat portions 98 of bearing 93, thereby holding the latter on seat 92. Engagement between shoulder 91 of control means 40 and bearing 93 limits the outward movement of the control means.

Handle 22, as shown, has the shape of an inverted cup. The cup closure is non-rotatably secured to control means 40, and the cup walls constitute a skirt partially or entirely enclosing the sleeve portion 87 of bearing member 85, depending on the longitudinal position of control means 40. Inward travel of handle 22 and associated control means 40 is limited, in the illustrated form of the invention, by engagement between washer 106, presently to be mentioned, and bearing 93, as shown in FIGS. 2 and 5.

The outer end portion of control means 40 is reduced in size, as shown at 100 in FIG. 11, and the inner part of this reduced portion is non-circular, i.e., provided with a flat, as shown at 101. The outer part of reduced portion 100 is further reduced and provided with threads 102. The closure of inverted cup-shaped handle 22 has a non-circular central opening 105 (FIG. 11) adapted to receive reduced portion 100 of control means 40 in keyed manner. As shown, washers 106 and 107 are located on opposite sides of the handle closure, and a nut 108 serves to secure handle 22 on control means 40 in non-rotatable manner.

The closure of handle 22 is recessed so nut 108 may be enclosed, and a covernig insert 110 is detachably secured within the recess. Indicating arrow 23 or the like may be applied to insert 110, as shown in FIG. 1.

The interior wall of the skirt portion of handle 22 desirably may be provided with inwardly extending spaced longitudinal ribs 112 and 113 (FIG. 3). These ribs are adapted to engage a lug 115 forming part of bifurcated member 97 in order to limit the rotational range of handle 22 and control means 40. Ribs 112 and 113 and lug 115 are provided mainly for convenience and for satisfying a psychological requirement that the handle of a valve should have a limited range of rotational movement. The valve, of course, would function equally well if rotational range-limiting stops were not provided.

The several main valve parts are assembled together in simple and easily separable manner by means of bolts extending longitudinally of the valve. As best shown in FIGS. 3, 6, 7 and 9, three bolts 122, 123 and 124 are provided in the illustrated form of the invention. These bolts extend through aligned openings in bearing member 85 and cartridge 50, and into threaded openings in lower body part 45, as shown in FIG. 2. Access to bolts 122, 123 and 124 is obtained by removing handle 22.

The threaded openings in lower body part 45 desirably extend completely through the body part, and at the lower ends they receive bolts 125 (FIG. 2) that secure valve body 25 to mounting plate or base 16.

The foregoing portion of the specification, except for the brief description of FIGS. 13–24, is substantially the same as the specification of applicants' aforesaid prior copending application, Ser. No. 477,384, filed Aug. 5, 1965, for Proportioning Valve. The following portion of the specification, as well as FIGS. 13–25, deals with a modified second embodiment of the invention, and constitutes the new matter added in this continuation-in-part application.

The embodiment of the invention shown in FIGS. 13–25 incorporates certain improvements in the embodiment shown in FIGS. 1–12.

The experience of applicants with the first commercial valves of the invention has suggested the desirability of certain modifications which enhance the previously established superior qualities of the valve. In brief, these improvements (1) provide increased fluid flow, particularly under low pressure conditions, (2) reduce the "breakout" force required for operating the valve following an extended period of non-use, thereby providing smoother manual action, (3) provide better control of friction, and (4) eliminate the possibility that fluid pressure in the supply lines could alter the axial position of the control means under certain conditions of adjustment.

The structural modifications which produce these improvement are illustrated in FIGS. 13–18 (resilient sleeve), FIG. 19 (rigid secondary sleeve insert for resilient sleeve), FIG. 20 (control means), and FIGS. 21–24 (cartridge portion of valve body). FIGS. 24 and 25 show the assembled relationship of these four modified components.

Referring to FIGS. 13–18, the modified resilient sleeve of the second embodiment is designated 135. Sleeve 135 may be formed of selected natural or synthetic rubber, or of suitable resilient plastic material.

One main difference between modified sleeve 135 and the sleeve 35 illustrated and described in connection with the first embodiment is that sleeve 135 in the region of the inlet ports 136 and 137 (FIG. 22) in the cartridge part of the valve body is noncircular in transverse cross section, both externally and internally. Thus, referring to FIGS. 13, 14 and 18, sleeve 135 is formed so that the exterior portions thereof opposing inlet ports 136 and 137 are surfaces 138 and 139, preferably flat, which, when the normal shape of sleeve 135 is not changed by the control means, have spaced relation with the ports. With this geometry, pressure of the incoming fluid is not solely relied upon to displace the resilient sleeve portions away from the ports, and substantially the full pressure of the fluid is effective to influence the volume of flow.

The sleeve wall inwardly of surfaces 138 and 139 is thickened, compared with the wall in the lower portion of the sleeve, as best shown at 138a and 139a in FIGS. 14 and 18, and the inner surfaces 140 and 141 of these thickened wall portions also preferably are flat, the respective surfaces 138, 139, 140 and 141, as illustrated, having generally parallel relation as shown in FIG. 18. The thickened sleeve portions hereinafter are sometimes referred to as resilient portions in effective relation with the inlet ports 136 and 137. The reason for the thickened portions 138a and 139a of sleeve 135 will be mentioned later.

The walls of the illustrated sleeve 135 in the upper portion of the sleeve and between the surfaces 138 and 139 have exterior bosses 142 and 143, as best shown in FIGS. 17 and 18. The purpose of these exterior bosses will be mentioned later, it being understood that a single boss would perform the intended function.

Sleeve 135, as in the case of previously described sleeve 35, preferably has a closure 145 at its lower end, and a radial flange 146 at its upper or open end. The top surface of flange 146 merges into a chamfered surface 147 (FIGS. 13–17) which in turn merges into the adjacent interior surface of the sleeve. As before, the chamfered surface cooperates to provide smooth action between sleeve 135 and the control means.

The resilience of portions 138a and 139a in relation to the rest of sleeve 135 and the displaceability of the portions in response to the control means are enhanced by reducing somewhat the cross sectional thickness of sleeve 135 at the upper part of the portions below chamfered surface 147, as best shown at 148 in FIGS. 14 and 16. The thickness also is reduced at the lower part of the portions as the latter merge into the lower length of the sleeve, as shown at 149 in FIG. 14.

Radial flange 146 on sleeve 135 has the same clamped relationship with the valve body, or cartridge portion of the valve body, and bearing member 85 (FIGS. 2, 3, 5, 8 and 11) as in the first described embodiment.

Referring to FIG. 19 at the bottom of drawing sheet 4, the component there shown in perspective is a secondary sleeve 150 formed of relatively stiff, low friction material such as suitable plastic. This secondary sleeve 150, which is disposed within resilient sleeve 135, functions to reduce friction between sleeve 135 and the valve control means, and also functions as a stiffening member for sleeve 135. In consequence of the latter function, secondary sleeve 150 prevents collapse of sleeve 135 due to fluid pressure. When collapse is prevented, a pinching force otherwise tending, under certain conditions of valve adjustment and lubrication, to move the control means axially in direction to increase the flow is eliminated.

Secondary sleeve 150 has a radially extending flange 151 at one end, the other end preferably being closed for imparting extra stiffness to the lower length of resilient sleeve 135. Sleeve 150, as mentioned, is adapted to be received snugly within resilient sleeve 135, the flange 151 of secondary sleeve 150 overlying flange 146 of resilient sleeve 135. The upper surface of flange 151 is joined to the interior surface of sleeve 150 by a chamfered surface 152. The lower surface below chamfered surface 152 likewise is a chamfered surface, the latter overlying chamfered surface 147 of sleeve 135.

Secondary sleeve 150 has a pair of openings 153 and 154 (FIG. 19) which, when the resilient and secondary sleeves 135 and 150 are assembled, are aligned with the resilient portions 138a and 139a of sleeve 135 in effective relation with inlet ports 136 and 137 of the valve body or cartridge. The increased thickness of these resilient portions 138a and 139a is such that the portions extend through openings 153 and 154 of secondary sleeve 150, the inner surfaces 140 and 141 of the portions lying interiorly of sleeve 150, as shown in FIG. 24. Openings 153 and 154 in sleeve 150 preferably extend somewhat through the chamfered walls and into flange 151, as shown in FIG. 19, to give desired flexibility in those regions of resilient sleeve 135.

Referring to FIG. 20 in the center of drawing sheet 4, control means or member 160 of the modified second embodiment is substantially the same as previously described control means 40. Control means 160 has a cylindrical portion 161 and an adjacent portion 162 having the shape of a modified cone. Adjacent portion 162 and adjoining short length 163 of cylindrical portion 161 preferably are roughened slightly, as by sand blasting either those portions of the control means itself or those portions of the mold in which control means 160 is formed. The roughened surface is stippled and designated 164 in FIG. 20. The purpose for this roughened surface will be mentioned presently.

As previously described, secondary sleeve 150 fits inside of resilient sleeve 135, the resilient portions 138a and 139a of the latter sleeve extending through the openings 153 and 154 in the secondary sleeve. Control means 160 is received within the thusly assembled secondary sleeve 150. With this arrangement, the only parts of resilient sleeves 135 engaging control means 160 are the inside walls 140 and 141 of the resilient portions 138a and 139a. Thus, the area of contact between resilient sleeve 135 and control means 160 is minimized, thereby reducing friction experienced during movement of the latter, and minimizing so called "breakout" resistance between control means 160 and resilient sleeve 135.

The breakout resistance between control means 160 and resilient sleeve 135 is caused by an adhesion occurring during an extended period of non-actuation of the control means. This adhesion is believed to be a molecular phenomenon, and it tends to cause initial sticking of the control means following a period of non-use. By minimizing the area of contact between control means and sleeve by means of secondary sleeve 150, the breakout resistance is accordingly minimized, or reduced to negligible amount, providing smooth initial action of the manual control means at all times.

Secondary sleeve 150 also cooperates to limit the volume of fluid flow through the valve under conditions of high fluid pressure, thereby preventing excessive splashing in the sink or wash bowl. This result is due to the increased stiffness imparted by secondary sleeve 150 to those portions of resilient sleeve 135 remote from resilient portions 138a and 139a. In other words, sleeve 135 is displaced less under high pressure than the sleeve 35 of the embodiment of FIGS. 1–12, thereby limiting the area for fluid flow. Further, secondary sleeve 150 functions to advantage in preventing unwanted axial movement of control means 160, as next described.

In the valve of the first embodiment shown in FIGS. 1–12, as previously mentioned, there have been occasional instances where excessive fluid pressure in the valve body recess has caused collapse of the resilient sleeve and thus axial displacement of control means 40 in direction toward wider open position. This condition tends to occur only when control means 40 is set rotationally for mixing or proportioning, and axially to provide fluid flow in less than maximum volume. Further, the condition tends to occur only in the presence of excessive lubrication between control means 40 and sleeve 35. The stiffness imparted to the resilient sleeve by secondary sleeve 150 tends to prevent the aforesaid collapse and displacement.

The aforesaid roughened surface 164 of modified control means 160 provides a controlled amount of friction between control means 160 and the engaged resilient portions 138a and 139a of sleeve 135, thereby stabilizing the relationship and also tending to prevent the valve from opening wider from a partly open mixing position in response to higher than ordinary fluid pressures, acting on portions 138a and 139a in the presence of excess lubrication. A control means 160 with roughened surfaces 164 also may be used to advantage in the first embodiment. As mentioned above, the stiffness imparted to resilient sleeve 135 by secondary sleeve 150 also aids in preventing unwanted axial movement of control means 160 under the circumstances described.

Referring to FIGS. 21–25, the illustrated cartridge portion of the valve body embodies certain modifications which cooperate to increase the volume of fluid flow under conditions of low pressure. This modified structure, as will be seen, has functional relationship with the resilient portions 138a and 139a of member or sleeve 135 which close and open in varying degree the inlet ports 136 and 137, and are spaced therefrom when not displaced by control means 160.

FIGS. 21–23 are views of a modified cartridge 170 forming part of the valve body. Cartridge 170, as in the case of the previously described cartridge 50, constitutes the upper part of the valve body, and contains the upper portion of the valve body recess. Modified cartridge 170 has generally the same construction as cartridge 50, including central core 171 (FIG. 22), inlet passageways 172 and 173 therein, reinforcing ring 175, and molded material 176 between core and ring, as well as on the lower face 177 of the cartridge.

The main structural difference between modified cartridge 170 and cartridge 50 of the first embodiment resides in the provision of annular bosses 180 and 181 (FIGS. 21-23) respectively surrounding the inlet ports 136 and 137. The resilient portions 138a and 139a of sleeve 135, of course, seal against these bosses when moved into sealing position by control means 160, some of the displaced material of portions 138a and 139a flowing around the edges of the bosses to establish the seals.

Bosses 180 and 181 in effect provide increased space or flow area within the valve body recess adjacent ports 136 and 137 for the flow of fluid, thereby reducing flow resistance at the ports and increasing the flow. Further, as previously mentioned, the resilient portions 138a and 139a of sleeve 135 are so formed as normally to be spaced from the inlet ports 136 and 137, or more properly from the bosses 180 and 181 surrounding the inlet ports, when not displaced by control means 160. Thus, pressure of incoming fluid is not required for the purpose of displacing the resilient portions 138a and 139a inwardly to open the ports, as was true in the first embodiment of FIGS. 1–12. Accordingly, the modified second embodiment is capable of handling a greater fluid flow at low pressures, although the over-all stiffness of sleeve 135 effectively limits the flow volume under conditions of excessively high pressure, as is desirable.

As best shown in FIG. 22, the upper end of central opening or recess 185 in the valve body or cartridge 170 is enlarged as shown at 186. The enlargement 186 is adjacent and immediately above bosses 180 and 181, and it provides increased space effective to enhance the volume of fluid flow from inlet ports 136 and 137, particularly at lower pressures.

It will be noted in FIGS. 21 and 23 that the longitudinal walls surrounding central recess or opening 185 in the valve body or cartridge have one or more radial recesses 190 and 191 at locations spaced from bosses 180 and 181 and associated inlet ports 136 and 137. Two such radial recesses are shown in FIGS. 21 and 23. The radial recesses 190 and 191 receive bosses 142 and 143 (FIGS. 17 and 18) on the exterior of sleeve 135, and thereby properly orient the sleeve in the valve body or cartridge so that resilient portions 138a and 139a of the sleeve have desired effective relation with ports 136 and 137.

Referring to the non-sectioned bottom view portion of FIG. 23 and to FIG. 25, it will be noted that the molded material 177 covering the bottom of cartridge 170 is provided with a series of ribs designated 195. These ribs, located as shown, establish more positive isolation between incoming passageways 172 and 173 and the recess 185 from which the fluid exits through the outlet port.

In the foregoing description distinction has been made between (1) breakout force or resistance and (2) friction experienced during actuation of the valve. Further, certain structural and functional features of the valve have been referred to in connection with breakout resistance, actuating friction, or both. In the interest of completeness, these aspects of the invention will be discussed further.

Breakout resistance and the actuating friction experienced between control means 160 and resilient sleeve 135 are caused by either one or both of two factors. The first factor is the mechanical or surface profile relationship between control means 160 and resilient sleeve 135, the relationship which produces friction in the conventional mechanical sense. The other factor, as previously mentioned, is believed to be a chemical or molecular relationship between the control means and sleeve. Both factors are effective in establishing the amount of breakout resistance that will be experienced, whereas only the surface profile relationship is effective in determining the amount of actuating friction that will be experienced.

Breakout resistance, as mentioned, is a phenomenon experienced when control means 160 is moved axially or rotated after an extended period of non-movement. Firstly, the surface profile relationship produces resistance to movement following a period of non-movement because of the nature of the material in resilient sleeve 135. The surface of the sleeve in contact with control means 160 over a period of time tends to conform or take a set to the surface profile of the control means. Thus, the rougher the surface of the control means, the more microscopic "interlocking" between the surface elements will occur. Consequently, the rougher the surface profile, the greater is the breakout resistance due to the profile relationship when control means 160 is moved following an extended period of non-use.

The aforesaid chemical or molecular relationship also increases the breakout resistance. This relationship also requires a time period of non-actuation during which the chemical or molecular adhesion develops.

Actuating friction, by comparison with breakout resistance, is experienced only when control means 160 is being moved axially or rotated. The amount of this friction is determined solely by the surface profile relationship between the control means and the portions of resilient sleeve 135 engaged thereby. The rougher the surface profile, the greater the amount of friction that will be experienced.

Both breakout resistance and actuating friction can be minimized by reducing the surface areas of control means 160 and resilient sleeve 135 which come in contact. The contacting surface areas in the FIGS. 13–25 embodiment, of course, are much smaller than in the FIGS. 1–12 embodiment.

For breakout resistance, reduction in surface contact area is the simplest and most effective way to minimize the aforesaid molecular relationship. While the reduction in contact area minimizes the surface profile factor contributing to breakout resistance, a smoother surface profile on each part also reduces the breakout resistance.

Actuating friction is minimized both by reduction in surface contact area and a smoother surface profile on each part. In all instances, the surface profile is most significant as related to control means 160, rather than resilient sleeve 135, mainly because control means 160 is formed of rigid material and the surface profile thereof has greater influence from the frictional standpoint.

In the FIGS. 13–25 embodiment of the invention, the surface contact area between control means 160 and resilient sleeve 135 has been established by means of secondary sleeve 150 at a reasonable and workable size, determined in part by actuating friction and breakout resistance considerations, and in part by other factors. The surface contact area thus having been determined, further consideration was given to the surface profile relationship in order to produce optimum results as to actuating friction and breakout resistance, and control means 160 was provided with both smooth and roughened surfaces.

Referring again to control means 160 shown in FIG. 20, non-stippled cylindrical portion 161 thereof, the portion of the control means in pressurized contact with resilient sleeve 135 when the valve is in "off" position during a period of non-use, is smooth in surface profile. This smooth surface, of course, helps establish the desired level of breakout resistance.

The roughened portion 164 of control means 160, as mentioned, provides a controlled amount of friction between control means 160 and resilient sleeve 135. In addition to stabilizing the relationship between the two, this friction statisfies the user's expectation that a certain amount of actuating friction should be encountered in adjusting the valve from one setting to another.

From the above description it is thought that the construction and advantages of this invention will be readily apparent to those skilled in the art. Various changes in detail may be made without departing from the spirit or losing the advantages of the invention.

We claim:

1. A proportioning valve comprising:

a valve body having a recess and an outlet port and a pair of spaced inlet ports in the longitudinal wall of said recess, said inlet ports adapted to direct fluids of different characteristics into said recess;

a sleeve of resilient material within said recess and overlying said inlet ports; and control means within said sleeve, said control means axially movable and rotatable with respect to said sleeve to cooperate with said sleeve for holding said sleeve against said inlet ports to close both such ports when in a first axial position and for respectively varying the quantity and proportion of fluid flow through said inlet ports when moved axially away from said first axial position.

2. The proportioning valve of claim 1 wherein the recess wall portions containing the spaced inlet ports are cylindrical segments, and the recess wall portions intermediate the ported wall portions lie outwardly of the extended cylinder of the ported wall portions, whereby said sleeve assumes substantially an elliptical shape, thus reducing contact friction between said control means and said sleeve, and space adjacent the ported wall portions is provided to receive displaced resilient material when said control means seals said sleeve over an inlet port.

3. The proportioning valve of claim 1 wherein said control means has a cylindrical portion for sealing said sleeve over both inlet ports simultaneously and an adjacent portion having the shape of a modified cone, the cone axis of said adjacent portion intersecting the axis of said cylindrical portion and extending therefrom at an angle, a surface part of said adjacent portion of minor peripheral extent constituting an extension of said cylindrical portion and adapted to seal said sleeve over an inlet port at any axial position of said control means, the other surface parts of said adjacent portion cooperating with said sleeve for varying the quantity and proportion of fluid flow through said inlet ports.

4. The combination of claim 3 wherein the chord subtending the cylindrical surface part of said adjacent portion is of length slightly exceeding the diameter of an inlet port.

5. The combination of claim 3 wherein the surface of said cylindrical portion of said control means and the non-cylindrical surface of said adjacent portion are connected by an axially extending curved surface which cooperates to provide smooth axial movement of said control means with respect to said sleeve.

6. The proportioning valve of claim 3 wherein the diameter of said cylindrical portion, the cone axis angle and length and geometry of said adjacent portion of said control means and the diameter of said inlet ports are so related that the total fluid flow through the valve when both inlet ports are opened to maximum extent simultaneously does not exceed the flow through the valve when one of said inlet ports is closed and the other is opened to maximum extent.

7. The proportioning valve of claim 1 wherein said sleeve is tubular in undistorted shape and provided at one end with an outwardly extending sealing flange, and with the addition of a bearing means for said control means, said bearing means secured to the recessed end of said valve body, said flange of said sleeve clamped between said valve body and said bearing means.

8. The combination of claim 7 wherein the interior surface of said sleeve and the outer end face of said sealing flange are joined by a chamfered surface that cooperates to minimize friction between said control means and said sleeve at the clamped flange end.

9. The proportioning valve of claim 1 wherein the interior surface of said sleeve is provided with spaced recesses, and with the addition of a lubricant in said recesses, thus providing long time lubrication between said control means and said sleeve.

10. The combination of claim 9 wherein said recesses extend longitudinally of said sleeve.

11. The proportioning valve of claim 1 wherein said valve body includes a valve cartridge comprising:

a core having a longitudinal opening therethrough which meets and forms an extension of said valve body recess, said spaced inlet ports extending from the wall of said core opening to the exterior of said core, the outer surface of said core having longitudinal recesses respectively leading to each inlet port from a core end;

a reinforcing ring surrounding said core in spaced relation therewith; and resilient material filling the space between said core and ring and providing outer walls for the longitudinal recesses, thus forming inlet passages leading to said inlet ports.

12. The combination of claim 11 wherein said resilient material also covers the surface of said core at said core end, whereby to seal said cartridge to the remaining part of said valve body and isolate said valve body recess and said inlet passages from each other.

13. The combination of claim 12 wherein said reinforcing ring terminates short of said end surface covered with resilient material and wherein the adjacent face of said remaining part of said valve body has a recess with tapered walls which snugly receives said covered end surface and establishes a peripheral seal having pressure and compression characteristics.

14. The combination of claim 11 wherein said sleeve has an outwardly extending sealing flange at one end which engages the other end of said core, and with the addition of bearing means for said control means, said bearing means secured to said cartridge, said flange of said sleeve clamped between said bearing means and said other core end.

15. The proportioning valve of claim 1 wherein said sleeve is closed at its lower end, whereby fluids passing through the valve are isolated from the sleeve interior and from said control means.

16. The proportioning valve of claim 15 wherein the interior surface of said sleeve is provided with longitudinally extending serrations, and with the addition of a lubricant in the recesses between said serrations, thus providing extended lubrication for said control means and said sleeve.

17. The proportioning valve of claim 15 wherein the walls of said sleeve are reduced in thickness in the region intermediate said inlet ports and the closed lower sleeve end, whereby increased flexibility is imparted to the sleeve walls overlying said ports and relative resistance to flexing is maintained at the closed lower sleeve end to minimize engagement in that region between sleeve and control means, thereby reducing friction and opposing the tendency of unwanted movement of said control means by the pressure of the fluid in said valve.

18. The proportioning valve of claim 1 with the addition of a secondary sleeve of thin, low friction material disposed between said sleeve of resilient material and said control means, said secondary sleeve extending axially in the region of said ports and adapted to flex in generally the same manner as said sleeve of resilient material.

19. The proportioning valve of claim 18 wherein said secondary sleeve has an upper outwardly extending flange, said sleeve merging into said flange with an outward taper.

20. The proportioning valve of claim 1 with the addition of a bearing member for said control means secured to said valve body, and a handle on said control means.

21. The proportioning valve of claim 20 with the addition of means limiting the inward and outward axial movement of said control means.

22. The proportioning valve of claim 20 with means limiting the rotational movement of said control means.

23. The proportioning valve of claim 22 wherein said limiting means comprise a radially extending lug on said bearing member and a pair of spaced longitudinal ribs on the interior of said handle.

24. The proportioning valve of claim 7 with the addition of longitudinally extending bolts securing said bearing means and said valve body together with said flange of said sleeve clamped therebetween.

25. A proportioning valve comprising:
a valve body having a recess with an outlet port exiting from the recess and a pair of inlet ports entering the recess which are, with respect to the recess, circumferentially spaced from one another;
a tubular sleeve inserted into said recess with a closed end within the recess and an open end opening outwardly from the recess;
said sleeve having inwardly deflectable resilient portions overlying said inlet ports which are adapted to be held against such ports to close the same, and which open the ports when deflected inward; and
a control rod member inserted in said sleeve that is movable axially and rotatably with respect to the sleeve;
said control rod member having a portion that when axially aligned with said inlet ports simultaneously holds said deflectable resilient portions of said sleeve against said inlet ports to close the same, and said control rod member further having a tapered portion that when axially shifted in front of the inlet ports and rotated allows said resilient portions to deflect inwardly to vary the quantity and proportion of fluid flow through said inlet ports.

26. A proportioning valve comprising:
a valve body having a longitudinal recess, a pair of spaced inlet ports in the longitudinal wall of said recess and an outlet port leading from said recess;
a member within said recess having resilient portions in effective relation with said inlet ports; and
control means within said member, said control means axially movable and rotatable with respect to said member to cooperate with said resilient portions of said member for respectively varying the quantity and proportion of fluid flow through said inlet ports, there being an axial position of said control means at which the control means displaces said resilient portions and seals them against said inlet ports to close the same and other axial positions at which the control means permits controlled variation in the opening of said inlet ports.

27. The combination of claim 26 wherein said resilient portions in effective relation with said inlet ports, when not displaced by said control means, are in spaced relation with said inlet ports, whereby fluid flow through the valve is increased, particularly under conditions of low fluid pressure.

28. The combination of claim 27 wherein said resilient portions have flat surfaces facing said inlet ports.

29. The combination of claim 27 wherein said member within said recess is a sleeve of resilient material, with the addition of a secondary sleeve of relatively stiff, low friction material between said member and said control means, said secondary sleeve having openings aligned with said resilient portions, said resilient portions thickened to extend through said openings into engagement with said control means, thereby minimizing the area of contact between said member and said control means and minimizing friction and breakout resistance between said member and said control means.

30. The combination of claim 29 wherein said control means has a cylindrical portion for displacing said resilient portions of said member within said recess into sealed relation with both said inlet ports simultaneously and an adjacent portion having the shape of a modified cone, the cone axis of said adjacent portion intersecting the axis of said cylindrical portion and extending therefrom at an angle, a surface part of said adjacent portion of minor peripheral extent constituting an extension of said cylindrical portion and adapted to seal a resilient portion of said member over an inlet port at any axial position of said control means, the other surface parts of said adjacent portion cooperating with said resilient portions for varying the quantity and proportion of fluid flow through said inlet ports.

31. The combination of claim 30 wherein the surface of said adjacent portion of said control means is roughened slightly to provide a controlled amount of friction between said control means and said resilient portions of said member, whereby high fluid pressure in said recess is ineffective to cause said control means to move axially in direction to increase the fluid flow under conditions of excessive lubrication.

32. The combination of claim 29 wherein said sleeve of resilient material includes a closure at one end thereof, said control means entering said sleeve through the open other end.

33. The combination of claim 27 wherein the longitudinal wall of said recess in said valve body has at least one radial cut out in a region spaced from said inlet ports, and wherein said member within said recess has an external boss received within said cut out to orient said member so that resilient portions thereof have correct effective relation with said inlet ports.

34. The combination of claim 27 wherein the longitudinal wall of said recess surrounding each inlet port is an annular boss, said resilient portions of said member within said recess sealing against said bosses when displaced into sealing position by said control means.

35. The combination of claim 34 wherein the open end of said recess in said valve body is enlarged adjacent said bosses to enhance fluid flow from said ports in direction toward the enlarged parts of said recess.

36. A proportioning valve comprising:
a valve body having a recess with an outlet port exiting from the recess and inlet ports entering the recess;
a tubular sleeve inserted into the recess with a closed end within the recess and an open end opening outward from the recess, such sleeve including deflectable resilient portions overlying said inlet ports adapted to be held against the same for closing the inlets and movable therefrom to permit fluid entry to the recess;
stiffening means for said sleeve along the length thereof at regions other than said deflectable resilient portions to resist inward collapse of said sleeve in response to fluid pressure within said recess; and
a control rod member inserted in said sleeve that is inward of said deflectable resilient portions for holding the same with respect to said inlet ports, said control rod member being axially and rotationally movable and having a tapered contour whereby axial and rotational adjustment varies the holding of said deflectable resilient portions with respect to said inlet ports.

37. A proportioning valve comprising:
a valve body having a pair of spaced inlet ports in the wall thereof and an outlet;
inlet port sealing means having deflectable portions overlying said inlet ports to seal the same when pressed thereagainst; and
control means associated with said valve body with the deflectable portions of said sealing means between the valve body and control means, said control means being relatively rotatable and axially movable with respect to said sealing means to cooperate with said sealing means for respectively varying the quantity and proportion of fluid flow through said inlet ports, there being one axial position of the control means that seals said sealing means deflectable portions against both said inlet ports to close the same and other axial positions that permit controlled variation in the opening of said inlet ports.

38. A proportioning valve as in claim 37 wherein said sealing means is a closed sleeve to separate the control means from fluid flowing from said inlet ports.

39. A proportioning valve comprising:
a valve body having a longitudinal wall with a pair of spaced inlet ports in the wall;
an outlet for the valve;
inlet port sealing means having deflectable portions in covering relation with respect to said inlet ports to seal the same when pressed thereagainst; and
control means in telescoped relation with said valve body that has axially extending longitudinal walls in front of said inlet ports and positioned with the valve body to have said deflectable portions sandwiched therebetween, said control means and said valve body being relatively rotatable and axially movable with respect to one another to have the control means cooperate with said inlet port sealing means for holding the deflectable portions thereof against said inlet ports to close both such ports when in a relatively first axial position and for varying the quantity and proportion of fluid flow through said ports when moved axially away from said first longitudinal position.

References Cited

UNITED STATES PATENTS

| | | | |
|---|---|---|---|
| 3,195,573 | 7/1965 | Daumy | 137—625.4 |
| 3,297,051 | 1/1967 | Church et al. | 137—625.17 |
| 3,378,034 | 4/1968 | Andrews | 137—625,17 |

M. CARY NELSON, Primary Examiner

M. O. STURM, Assistant Examiner